May 25, 1971 H. G. KLAWUNN ET AL 3,580,780
METHOD AND APPARATUS FOR BAR SEALING OF GIRDLE PANELS
Filed May 7, 1969 4 Sheets-Sheet 1
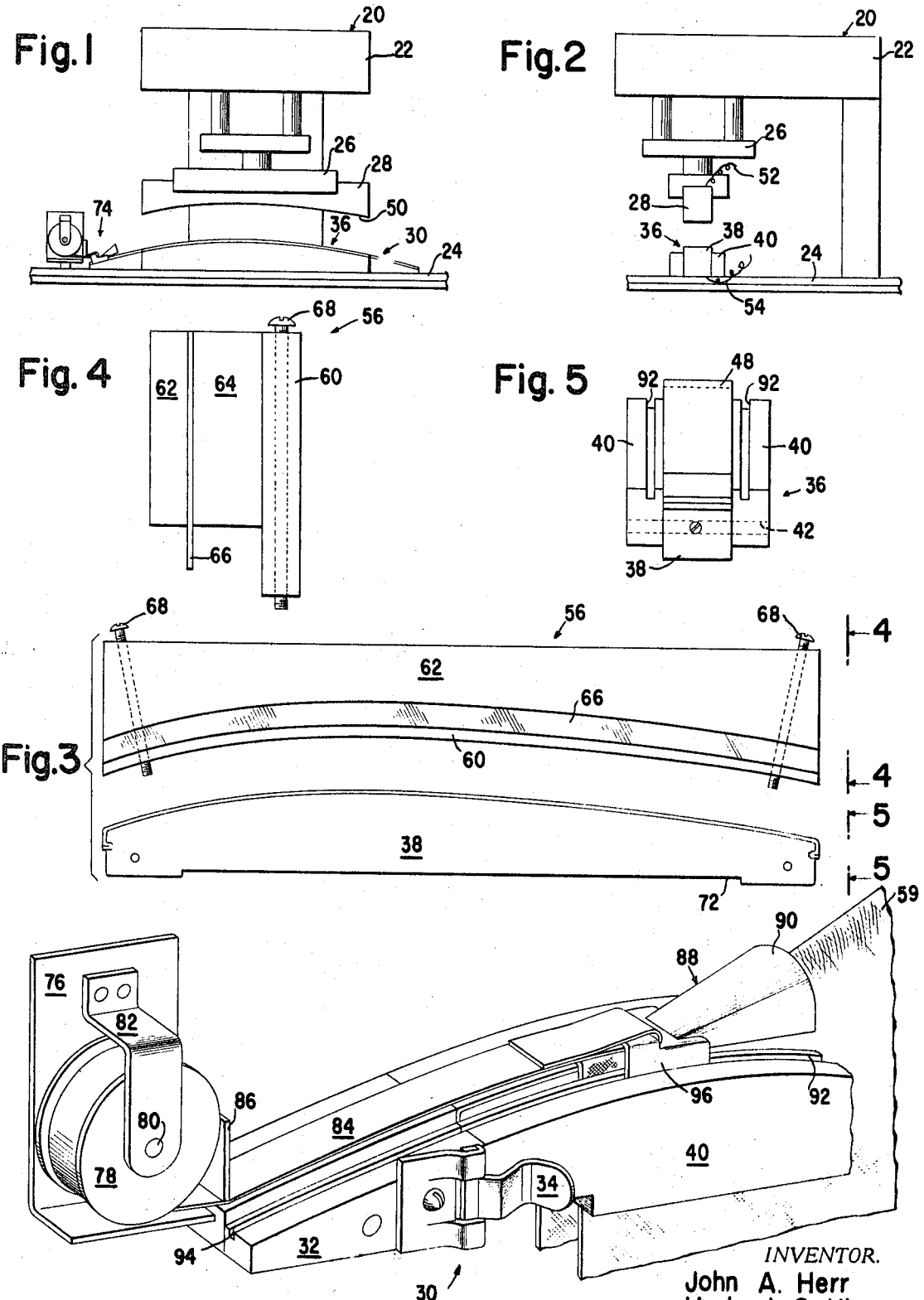
INVENTOR.
John A. Herr
Herbert G. Klawunn
BY
ATTORNEY

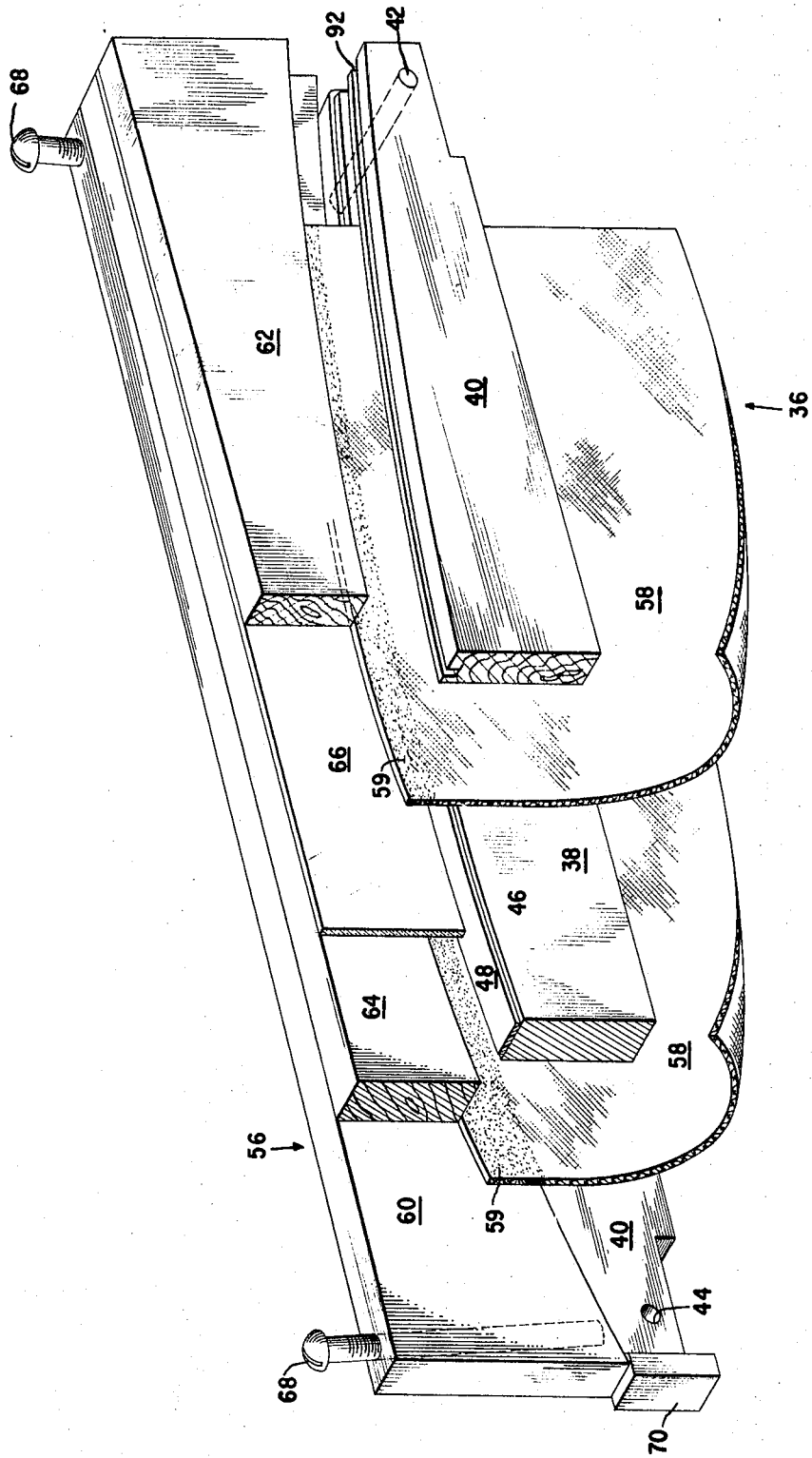

INVENTOR:
John A. Herr
Herbert G. Klawunn

BY

*Marshall J. Breen*
ATTORNEY

United States Patent Office 3,580,780
Patented May 25, 1971

3,580,780
METHOD AND APPARATUS FOR BAR SEALING OF GIRDLE PANELS
Herbert G. Klawunn, Millington, and John Addison Herr, Garwood, N.J., assignors to The Singer Company, New York, N.Y.
Filed May 7, 1969, Ser. No. 822,627
Int. Cl. B29c 27/04
U.S. Cl. 156—380                                                       7 Claims

ABSTRACT OF THE DISCLOSURE

This disclosure relates to a method and apparatus for bar sealing of girdle panels to form curved side seams, initially held in place by clamping and folding the same over a curved sealing die, which is subsequently mated with a second die along the seam to effect a seal, thermally or dielectrically.

BACKGROUND OF THE INVENTION

Heretofore, a curved seam for girdle panels had to be sewn, or if the seal was made by bonding the panels would have to be overlapped to a substantially flat area in order to avoid unwanted folds along the seam line joining said panels. Attempts to make curved bonded seams in continuous feed devices have resulted in puckered seams.

SUMMARY OF THE INVENTION

In accordance with the present invention the novel bar sealing of girdle panels is made in a device having a pair of mated dies adapted to coact to join the edges of the gridle panels which are susceptible of being sealed together to form a seam. One of the dies of the device is detachably connected thereto and has at least one side member detachably connecting to said die for clamping the pieces to said die with the edges to be joined extending from the die to form a predetermined margin. A folder means is adapted to be passed It is therefore an object of the present invention to provide an improved method and apparatus for bar sealing of girdle panels which overcomes the prior art deficiencies; which is simple, economical and reliable; which produces smooth seams regardless of fabric, along a curved line; which uses panels of fabric treated with an adhesive, or associated with an adhesive film, or capable of being bonded together in a device, thermally or dielectrically; which uses a removable die assembly including the die and associated side clamps upon which the panels are loaded and held in said die assembly; which has a loading fixture enabling the panels to be loaded upon the removable die with a predetermined margin; said fixture may be adjustably spaced relative said die; which uses a folder means including a masking means to fold and hold the outwardly extending margins of said panels upon said die; and which has a folding means passing upon tracks formed upon said die assembly.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a schematic representation of a front elevational view of the bar sealing device of the present invention.

FIG. 2 is a schematic representation of a side elevational view of the bar sealing device of the present invention.

FIG. 3 is a front elevational view of the die upon which the girdle panels are loaded, and the fixture used to establish the margins for said panels.

FIG. 4 is a view taken along line 4—4 of FIG. 3 and shows an end view of the fixture.

FIG. 5 is a view taken along line 5—5 of FIG. 3 and shows an end view of the die.

FIG. 6 is an enlarged perspective view, in part, of the left side of the clamped die, as represented in FIG. 1, showing a folding means and a roll of masking means, one end of which is attached thereto.

FIG. 7 is an enlarged perspective view, partly broken away of the sealing die in position against the fixture to establish predetermined margins for the girdle panels being held thereon by the side clamps.

DESCRIPTION OF THE INVENTION

Figure 8:
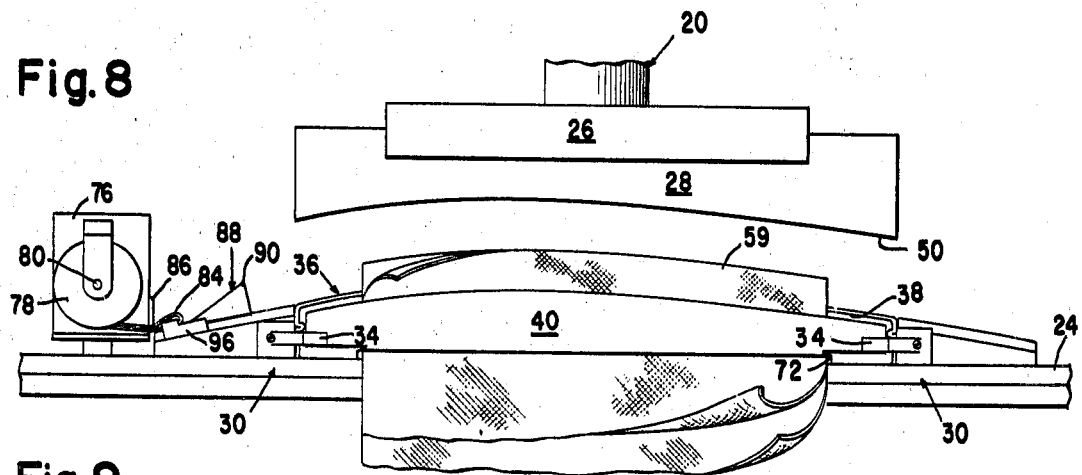
FIG. 8 is a schematic representation of the sealing die clamped in position upon the bar sealing device subsequent to placing the girdle panels on said die.

A conventional bar sealing device capable of applying a predetermined amount of heat and pressure to produce a bonded seam or connection is shown in FIGS. 1, 2 and 8–11 embodying the present invention.

The bar sealing device may be of any suitable type commercially available, the one shown for illustrative purposes in FIG. 1 is a dielectric machine, designated at 20, but the present invention could be practiced equally well with a thermal machine (not shown). The dielectric machine 20 includes a source of radio frequency current (not shown) disposed in a frame 22 having flat horizontal die supporting surface 24, above which is disposed a vertically movable die clamping assembly 26. An upper sealing die 28 is fixedly connected to the die clamping assembly 26 to be raised and lowered thereby.

A second clamping assembly 30 illustrated in FIGS. 1, 2 and 6, is mounted on the supporting surface 24, and includes a pair of end members 32 which carry spring clips 34 on the front and back sides thereof. A lower sealing die assembly 36 is positioned upon the supporting surface 24 to be detachably held between the end members 32, with the clips 34 yieldably biased into contact with the front and rear sides thereof.

Figure 16:
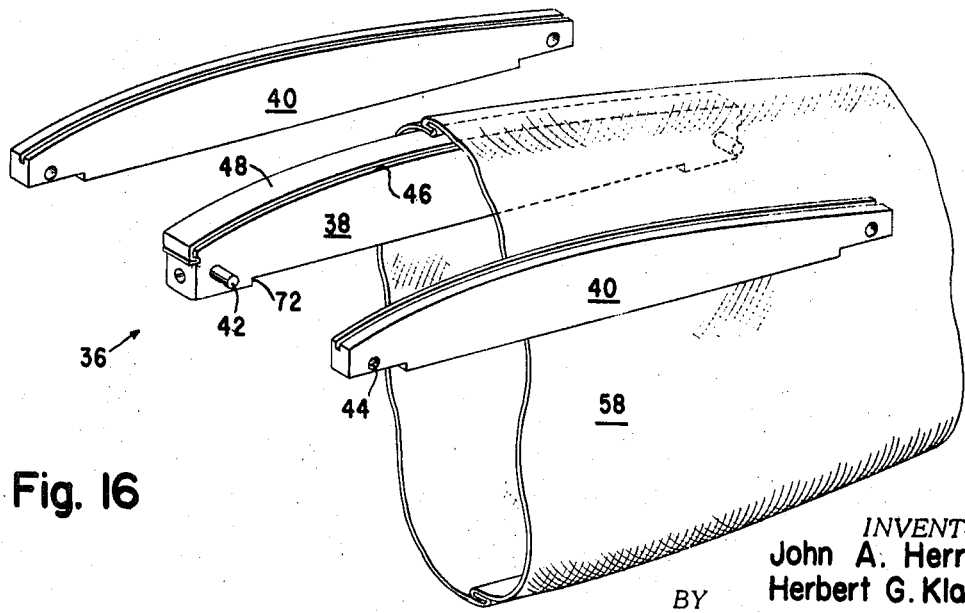
FIG. 16 is a perspective view showing the side clamping members separated from the sealing die so that the seamed girdle panels may be withdrawn from said sealing die.

The lower sealing die assembly 36, best seen in FIGS. 5, 7 and 16, includes a lower sealing die 38 sandwiched between two side members 40. The sealing die 38 carries positioning pins 42 that extend outwardly to enter apertures 44 of the side members 40. The upper mating surface 46 of the sealing die 38 is convexly curved and partially covered along its entire length by an insulating tape mask 48 is affixed at opposite ends of the die 38.

The upper sealing die 28 shown in FIG. 1, has a concavely curved lower surface 50 formed of a corresponding arcuate shape as that of the curved surface 46 of the sealing die 38 to permit mating along a substantially full line of contact upon operation of the dielectric machine 20. The upper sealing die 28 is suitably connected to the source of radio frequency current as represented in FIG. 2 by a conductor 52, and the lower sealing die 38 also is connected in circuit by a conductor 54. Operator actuating controls (not shown), among which are controllers for the pressure, frequency and operational time, may be selectively regulated during operation of the dielectric machine 20. The radio frequency current passes through the sealing dies 28 and 38 (which dies serve as electrodes) to generate the internal heat at the desired degree of pressure for the bonding operation in a manner well known in the art.

The present invention provides for obtaining a smooth fabricated bonded curved seam for fabric panels 58 regardless of whether such fabric is natural or synthetic, woven or non-woven, or stretch or non-stretch. In the presently described form the panels 58 may be assumed to be made of a fabric of synthetic woven, stretchable pieces for use as girdle panels. The edges for forming the seam have been treated with an acrylic resin adhesive along a predetermined margin 59 to permit formation of a strong bonded seam upon subsequent operation of the bar sealing device 20. Alternately the edges could have been otherwise coated or impregnated with a material susceptible of being heat sealed. A loading fixture 56 may be used to aid in establishing the prescribed margins 59.

The fixture 55 illustrated in FIGS. 3, 4 and 7 has a back member 60, a front member 62 and intermediate member 64 and a transparent plastic plate 66 sandwiched between members 62 and 64. The lower edges of the members 60, 62, 64 and 66 are curved substantially identical to the curve of the lower edge 50 of the sealing die 28. The lower edge of member 60 extends below the lower edges of the members 62, 64 and 66. The lower edge of the plastic member 66 is somewhat above the lower edge of the member 60, and above the lower edge of the member 66 are the lower edges of the members 62, and 64, each at an equal height. To facilitate the loading operation of fixture 56 the depth of the components are made equal to the depth of the adjacent component of the sealing die assembly 36.

Consequently, the depth of the members 60 and 62 are substantially equal to the depth of the sealing die 38.

Gauge adjusting screws 68 enable different marginal dimensions to be obtained in the fixture 56. The adjustment screws 58 in FIG. 7 are shown flush with the lower edge of the back member 60 and therefore will have no effect presently upon the margin. If a larger margin is desired the screw 68 could be adjusted downwardly as shown in FIGS. 3 and 4, until to a predetermined setting distance is obtained.

The fabric panels 58 are loaded onto the die assembly 36, as illustrated in FIG. 7, with the aid of the fixture 56. The upper edge of one side member 40 is placed against the lower edge of the back member 60 with the ends of said side member in abutment with end guide blocks 70. The location of this side member 40 controls that of the other components of the die assembly 36, and thus acts to set the marginal distance. Therefore, if a larger margin were desired the adjustment screws 68 would be turned down to space member 40 from the back member 60. A fabric panel 58 is placed atop the side member 40 with the edge to be bonded forming a margin 59 that extends onto the exposed side of the back member 60 and contacts the lower edge of the member 64 to form a predetermined marginal distance. The transparent plate 66 enables the operator to adjust the margin for the panel 58, from a maximum distance with the panel edge in control with the lower edge of member 64, to a somewhat reduced margin by leaving a space between the panel edge and the lower edge of the member 64. Guide lines could be scored upon the front lower face of the back member 60 if the marginal distance is to be adjusted frequently. The die 38 is now placed upon the fabric panel 58 and located relative the side member 40, by the pins 42, which extends into the apertures 44.

The next fabric panel 58 is placed upon the sealing die 38 with the side edge extending upwardly onto the transparent plastic guide plate 66 to the lower edge of the front member 62. Lastly, the side member 40 is disposed upon the outwardly extending positioning pins 42 to sandwich the sealing die 38 between the fabric panels 58 to complete the loading of the sealing die assembly 36.

The operator will transfer the loaded sealing die assembly 36 to the supporting surface 24 as shown in FIG. 8 wherein the ends of the die 38 are placed in abutment with the end members 32, and the spring clips 34 are positioned into contact with the ends of each of the side members 40, thus, securing the loaded sealing die assembly 36 upon said surface. The bottom of the sealing die 38 has a longitudinally extending recess 72 which extends for a distance slightly larger than the length of the fabric panels 58 so that said rear panel may be folded under the die 38 along the supporting surface 24 without interfering with the horizontal mounting of the sealing die assembly 36 upon said surface.

Once the fabric panels 58 have been loaded onto the die assembly 36 with the proper margin 69 the die assembly 36 will be secured to the support surface 24 as illustrated in FIG. 8. In this position a folder assembly 74 is used upon the margins 59 to fold and hold the same in the desired configuration of the subsequently bonded seam.

The folder assembly 74, best seen in FIG. 6, is mounted upon the right side of the supporting surface 24 by a bracket 76 affixed thereto. A masking roll 78 is rotatably carried by a pin 80 affixed to a downwardly extending arm 82 connected to the bracket 76. A masking means such as an insulating tape mask 84 is wound upon the roll 78, which may be spring biased for automatic rewind thereof. The leading edge of tape mask 84 is passed through a slotted guard 86 and connected to a folding guide 88 having a funnel shaped forward portion 90 which serves to guide and fold the margins of the girdle panels 58 as the folding guide 88 is passed along the upper surface of the die assembly 36. Each of the side members 40 have grooves 92 shown in FIGS. 5 and 6 formed in the upper surface and extending the longitudinal distance thereof. When the lower die 36 is positioned upon the surface 24 the grooves 92 will be aligned with grooves 94 formed in the end members 32. A folding guide 88 has downwardly extending projections 96 which seat in the grooves 92 and 94 and permit the folding guide 88 to be passed along the top surface of the die assembly 36 in a straight line to obtain uniform folding and masking of the margins 59. A suitable stop (not shown) will hold the folding guide 88 at the right end member 32 as shown in FIGS. 10 and 11.

Figure 9:
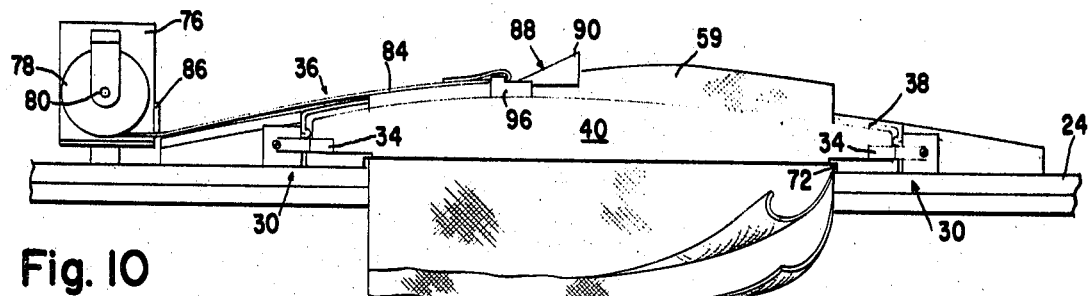
FIG. 9 is a schematic representation showing the folder means passing along the curved upper surface of the sealing die to fold the margin of the girdle panels.
Figure 10:
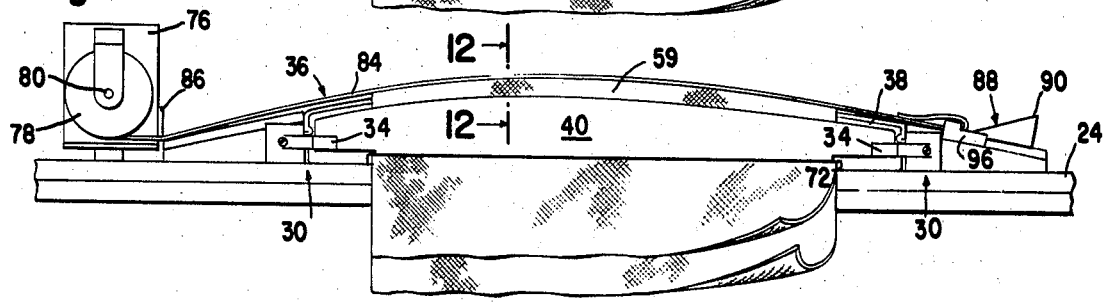
FIG. 10 is a schematic representation of the masking means holding the folded girdle panels against the curved surface of the sealing die.
Figure 11:
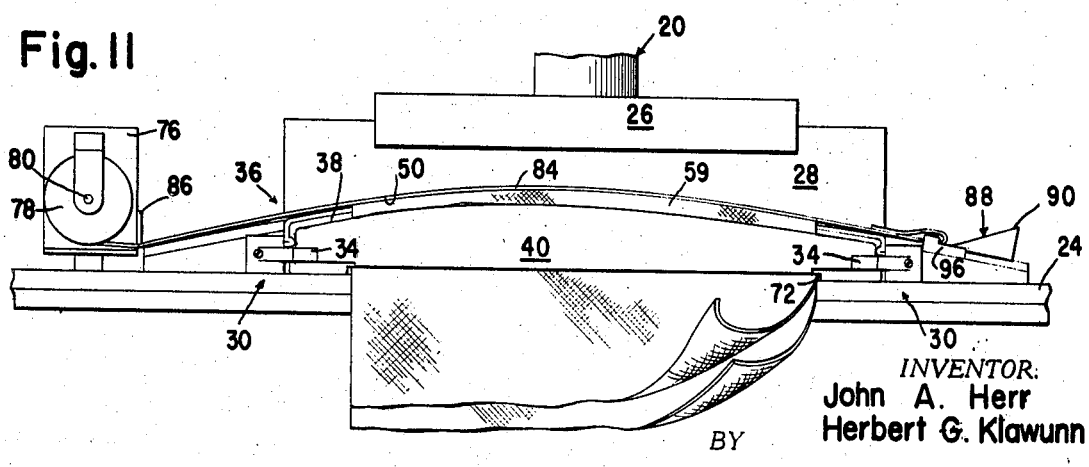
FIG. 11 is a schematic representation of the bar sealing device being operated to form a bonded seam.
Figure 12:
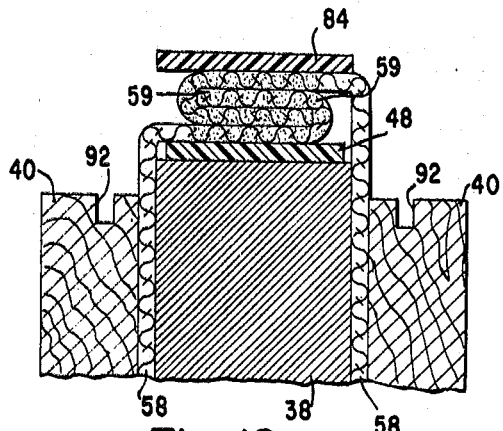
FIG. 12 is an enlarged view taken along line 12—12 of FIG. 10, and shows an interlapped fold of the margins of the girdle panels, which margins have been impregnated with suitable adhesive.

The folding guide 88 is passed from left to right as represented in FIG. 9 in the guide grooves 92 and 94 so as to fold and hold the margins in the folded position as shown in FIGS. 10 and 12. Lastly, as illustrated in FIG. 11 the bar sealing device is operated to form the bonded seam between the mated die assemblies 28 and 36. Since the mating surfaces of the die assemblies 28 and 36 are arcuately shaped the desired bonded seam is formed along a curved surface which is "pucker" free.

The second bonded seam will be formed by the other edges of the panels 58 by repeating the above described process. This will produce a completed tube-like member from the joined panels 58 which may be removed from one end of the lower die 38 as shown in FIG. 16 after separating the side members 40 therefrom.

Figure 13:
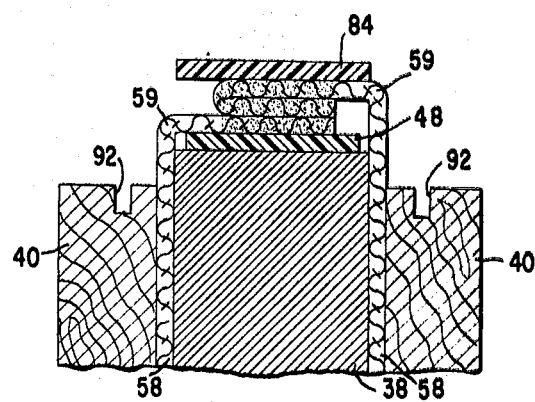
FIG. 13 is similar to FIG. 12 but shows the impregnated margins being jointed with the edges along thereof a common line.
Figure 14:
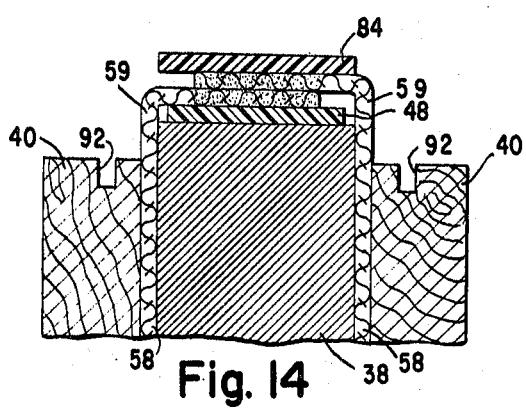
FIG. 14 shows a view similar to FIG. 12 with the impregnated edges of the margin forming a simple overlap seam.
Figure 15:
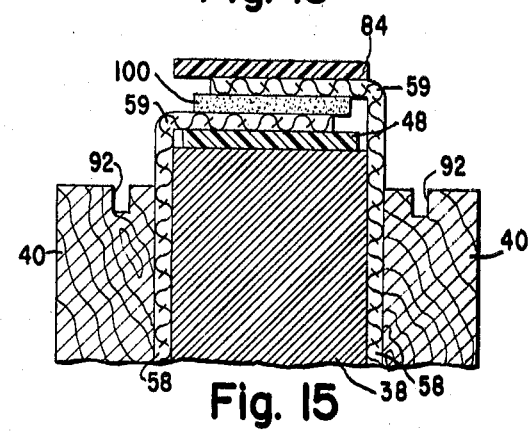
FIG. 15 shows a view similar to FIG. 14 except that an adhesive film is used rather than having the edges impregnated with the adhesive.

Folding guides, per se, are well known in the sewing machine art and any suitable fold may be formed by using an appropriate ugide. One form of preferred fold is shown in FIG. 12 in which both ends have been folded under each other to form an interlocking bonded seam. FIGS. 13, 14 and 15 show other typical folds which may be formed by use of modified guides. FIG. 13 shows a single edge folded under itself before overlapping the other edge while FIG. 14 shows a simple overlapped connection. The margins 59 represented in FIGS. 12, 13 and 14 have each been treated with an acrylic resin adhesive prior to loading in the die assembly 36. FIG. 15 shows an overlapped fold of untreated margins 59, between which an acrylic resin adhesive strip 100 has been inserted to permit formation of the bonded seam. The strip 100 may be added at the time of folding the margins 59 by having it passed with the folding guide 88, or otherwise, prior to operation of the bar sealing device 20. Regardless of which fold is used insulating masks 48 and 84 are positioned below and above, respectively, the folded margins 59 in order to protect the fabric during the operation of the bar sealing device 20.

It will be understood that various changes in the details, materials, arrangement of parts and operating conditions which have been herein described and illustrated in order to explain the nature of the invention may be made by those skilled in the art within the principles and scope of the invention as expressed in the claims.

Having thus set forth the nature of this invention, what we claim herein is:

1. In a bar sealing device adapted to join the edges of pieces susceptible of being sealed together into a seam the combination of:
    (a) a pair of dies having mating surfaces, one die fixedly connected to the device and one die detachably connected to the device,
    (b) at least one side member detachably connected to said detachable die for clamping the pieces to the die with edges to be joined extending from the die to form a predetermined margin,
    (c) a folder means adapted to be passed along the margins to place said edges in position, and
    (d) a masking means connected to the folder means and adapted to be passed along the margins therewith to hold the edges in folded position whereby on operation of said bar sealing device the edges will be joined.
2. The combination claimed in claim 1 wherein:
    (a) the detachable die defining the lower die,
    (b) a die supporting surface formed on said device upon which the lower die is placed,
    (c) a side member is detachably connected to opposite side of the lower die,
    (d) end members affixed to the support surface adjacent either end of the detachable die to prevent endwise displacement thereof, and
    (e) yieldable clips mounted on the end members and adapted to engage the side members to hold said side members and said pieces in assembled position.
3. The combination claimed in claim 2 wherein:
    (a) the side members have a tracking groove formed in the surface adjacent the mating surface of the die, and
    (b) a tracking member extending from the folder means adapted to pass into the tracking groove and guide the folder means over said die.
4. The combination claimed in claim 3 wherein:
    (a) the masking means defining an insulated tape mask,
    (b) the insulated tape mask formed in a roll, and
    (c) means adjacent one of the end members to rotatably support the tape mask roll including a spring rewinder therefor and a stop member to prevent the folder means to which the tape mask is attached from being wound onto the roll.
5. The combination claimed in claim 1 wherein:
    (a) the bar sealing device defines a dielectric mechanism.
6. A detachable die assembly for receiving pieces to be threadlessly joined in a dielectric bar sealer comprising:
    (a) a main member carrying an electrode adapted to be put in circuit with said sealer,
    (b) a pair of side members,
    (c) means to position the side members on the main member, and
    (d) an arcuately shaped mating surface for the main member.
7. The combination claimed in claim 6 wherein:
    (a) the mating surface is convexly shaped,
    (b) an insulation tape mask affixed along the mating surface to substantially cover said surface while leaving at least a portion of said electrode exposed.

References Cited
UNITED STATES PATENTS

| | | | |
|---|---|---|---|
| 2,741,296 | 4/1956 | Collins | 156—380 |
| 2,988,129 | 6/1961 | Kevelin et al. | 156—273X |
| 3,172,798 | 3/1965 | Rosenbaum | 156—380 |
| 3,434,910 | 3/1969 | Kunnegiesser et al. | 156—583 |

BENJAMIN R. PADGETT, Primary Examiner
E. E. LEHMANN, Assistant Examiner

U.S. Cl. X.R.
156—273; 219—10.53; 223—53